United States Patent
Heinrich et al.

(10) Patent No.: US 8,113,195 B2
(45) Date of Patent: Feb. 14, 2012

(54) BRINGING A MULTI-COMPONENT JET INTO THE VISUAL FIELD OF A USER

(75) Inventors: Hans-Juergen Heinrich, Hamburg (DE); Robert Surma, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1328 days.

(21) Appl. No.: 11/471,847

(22) Filed: Jun. 21, 2006

(65) Prior Publication Data
US 2007/0084465 A1   Apr. 19, 2007

Related U.S. Application Data

(60) Provisional application No. 60/693,131, filed on Jun. 23, 2005.

(30) Foreign Application Priority Data

Jun. 23, 2005   (DE) .......................... 10 2005 029 226

(51) Int. Cl.
- *A61M 16/00* (2006.01)
- *B60H 1/00* (2006.01)
- *B64D 13/00* (2006.01)

(52) U.S. Cl. .......... 128/203.13; 454/69; 454/71; 454/76

(58) Field of Classification Search ............. 128/203.16, 128/203.12, 203.25, 204.18, 204.21, 204.22, 128/204.25; 454/69–165; 165/41; 244/118.5
See application file for complete search history.

(56) References Cited

U.S. PATENT DOCUMENTS

| | | | | |
|---|---|---|---|---|
| 2,228,315 A | | 1/1941 | Hutton | 128/204 |
| 3,565,072 A | * | 2/1971 | Gauthier | 128/200.16 |
| 4,057,205 A | | 11/1977 | Vensel | 244/118 P |
| 4,119,097 A | | 10/1978 | Spector | 128/203 |
| 4,161,172 A | * | 7/1979 | Pickering | 600/22 |
| 4,262,495 A | | 4/1981 | Gupta et al. | 62/402 |
| 4,282,869 A | | 8/1981 | Zidulka | 128/200.28 |
| 4,428,372 A | | 1/1984 | Beysel et al. | 128/202.26 |
| 4,582,054 A | | 4/1986 | Ferrer | 128/200.23 |

(Continued)

FOREIGN PATENT DOCUMENTS

DE    297 17 065 U1    1/1998

(Continued)

OTHER PUBLICATIONS

F.P. Ricou et al.: Measurements of entrainment by axisymmetrical turbelent jets, *Mechanical Engineering Department, Imperial College of Science and Technology*, London, Nov. 23, 1960, pp. 21-32.

(Continued)

*Primary Examiner* — Justine Yu
*Assistant Examiner* — Valerie L Skorupa
(74) *Attorney, Agent, or Firm* — Ingrassia Fisher & Lorenz, P.C.

(57) ABSTRACT

A device for supplying a multi-component jet into the visual field of a user, wherein the device has a line, an outlet opening and a transport unit. An oxygen-containing component and a water-containing component can be supplied to the line. The transport unit can be used to transport a mixture consisting of the oxygen-containing component and the water-containing component through the line to the outlet opening, so that the mixture streams out of the outlet opening directly toward the visual field of the user.

20 Claims, 2 Drawing Sheets

U.S. PATENT DOCUMENTS

| | | | | |
|---|---|---|---|---|
| 4,597,917 | A | * 7/1986 | Lunsford | 261/153 |
| 4,734,072 | A | 3/1988 | Lastnik | 441/105 |
| 4,742,760 | A | * 5/1988 | Horstman et al. | 454/76 |
| 4,819,548 | A | 4/1989 | Horstman | 98/1 |
| 4,864,654 | A | 9/1989 | Schriver et al. | 2/84 |
| 4,960,119 | A | * 10/1990 | Hamlin | 128/204.18 |
| 5,052,493 | A | 10/1991 | Court | 169/9 |
| 5,199,423 | A | 4/1993 | Harral et al. | 128/202.26 |
| 5,297,989 | A | * 3/1994 | Stouffer et al. | 454/155 |
| 5,327,904 | A | 7/1994 | Hannum | 128/205.26 |
| 5,348,001 | A | 9/1994 | Danon | 128/205.24 |
| 5,405,249 | A | 4/1995 | Benson | 417/313 |
| 5,524,848 | A | * 6/1996 | Ellsworth | 244/118.5 |
| 5,651,733 | A | 7/1997 | Schumacher | 454/76 |
| 5,701,887 | A | 12/1997 | Rustad et al. | 128/204.17 |
| 5,791,982 | A | * 8/1998 | Curry et al. | 454/74 |
| 5,809,999 | A | 9/1998 | Lang | 128/200.24 |
| 5,874,536 | A | 2/1999 | Linsley et al. | 530/351 |
| 5,895,318 | A | 4/1999 | Smrt | 454/256 |
| 5,944,284 | A | * 8/1999 | Bardel | 244/118.5 |
| 5,984,415 | A | 11/1999 | Schumacher et al. | 297/411.2 |
| 6,119,689 | A | * 9/2000 | Korman | 128/204.18 |
| 6,443,393 | B1 | 9/2002 | Ooi et al. | 244/118.5 |
| 6,520,451 | B1 | 2/2003 | Moore | 244/118.5 |
| 6,793,179 | B2 | 9/2004 | Daniels | 244/118.5 |
| 6,796,307 | B1 | * 9/2004 | Hughson et al. | 128/205.12 |
| 6,817,576 | B2 | 11/2004 | Brady et al. | 244/118.5 |
| 6,874,536 | B2 | 4/2005 | Phillips et al. | 137/883 |
| 6,948,498 | B2 | 9/2005 | Cazenave et al. | 128/204.22 |
| 2002/0119745 | A1 | * 8/2002 | Thomassin et al. | 454/76 |
| 2004/0074496 | A1 | * 4/2004 | Hayashi et al. | 128/204.18 |
| 2005/0061915 | A1 | 3/2005 | Vogt et al. | 244/118.5 |
| 2005/0098683 | A1 | 5/2005 | Phillips | 244/118.5 |
| 2005/0103193 | A1 | 5/2005 | Lyons et al. | 95/54 |
| 2005/0116101 | A1 | 6/2005 | Pozzi et al. | 244/118.5 |
| 2005/0183726 | A1 | 8/2005 | Heinrich et al. | 128/204.29 |

FOREIGN PATENT DOCUMENTS

| | | |
|---|---|---|
| DE | 103 61 271 | 7/2005 |
| DE | 10 2004 024 615 | 12/2005 |
| EP | 0 779 207 B1 | 6/1997 |
| EP | 0 885 623 A2 | 12/1998 |
| WO | WO 91/07208 | 5/1991 |

OTHER PUBLICATIONS

Robert Surma, et al.: Geschwindigkeit und Größe der Tropfen in horizontalen Zweiphasen-Freistrahlen aus Wasser und Luft in ruhender Umgebung (Teil 1), TÜ Bd. 44(2003) Nr. 4—April, pp. 24-28. (Translation of the Abstract attached).

Robert Surma, et al.: Geschwindigkeit und Größe der Tropfen in horizontalen Zweiphasen-Freistrahlen aus Wasser und Luft in ruhender Umgebung (Teil 2), TÜ Bd. 44(2003) Nr.5—May, pp. 26-33.

* cited by examiner

BRINGING A MULTI-COMPONENT JET INTO THE VISUAL FIELD OF A USER

REFERENCE TO RELATED APPLICATIONS

This application claims the benefit of the filing date of German Patent Application No. 10 2005 029 226.7 filed Jun. 23, 2005 and of U.S. Provisional Patent Application No. 60/693,131 filed Jun. 23, 2005, the disclosures of which are hereby incorporated herein by reference.

FIELD OF THE INVENTION

The invention relates to a device and method for supplying a multi-component jet into the visual field of a user and an aircraft.

BACKGROUND OF THE INVENTION

In aircraft, extraction is often used to dehumidify the cabin air owing to electronic devices as well as the insulation and structure of the aircraft. The comfort limit for crew and passengers with regard to humidity as a rule is at least a relative share of 30%, while this share can only measure 1 to 2% at an altitude of 40,000 feet. Under certain conditions or flight operations, a preceding increase in the oxygen concentration in the breathable air of the flight crew or so-called loadmaster is necessary. As a rule, this so-called pre-breathing is necessary over a longer period to sufficiently elevate the oxygen concentration in the blood. The use of breathing masks over this long of a period is not comfortable enough in many instances. By contrast, a free oxygen jet with negligible moisture would increase wearing comfort, but cause the mucous membranes exposed to the jet to dry out in comparatively short order.

SUMMARY OF THE INVENTION

There may be a need to increase user comfort.

This need may be met by a device and method for supplying a free-jet to the visual field of a user, and by an aircraft with the device.

An exemplary embodiment of the invention provides a device for supplying a free-jet to the visual field of a user, wherein the device consists of a line, an outlet opening and a transport unit. An oxygen-containing component and a water-containing component can be supplied to the line. The transport unit can be used to transport a mixture of the oxygen-containing component and the water-containing component through the line to the outlet opening, so that the mixture streams out of the outlet opening toward the visual field of the user.

Also provided is an aircraft with a device with the features described above for supplying a free-jet (e.g., a two or multi-component jet) to the visual field of a user.

In addition, another exemplary embodiment of the invention provides a method for supplying a free-jet to the visual field of a user, wherein the method involves supplying an oxygen-containing component and a water-containing component to a line, transporting a mixture of the oxygen-containing component and water-containing component through the line to an outlet opening, and the mixture streaming out through the outlet opening toward the visual field of the user. This may make it possible to direct a two-component jet (i.e., a jet having at least two components) or a two-phase jet (i.e., a jet having at least two components varying in aggregate state, e.g., liquid and gaseous) directly toward the visual field of the user as a free-jet, possibly eliminating the need for breathing masks or other disturbing objects. This may increase the wearing comfort, while simultaneously possibly ensuring an elevated supply of oxygen and moisture to the user, thereby possibly both assuring an increased oxygen supply and preventing the mucous membranes from drying out.

Suitable safety measures may be taken not to increase the overall $O_2$ concentration in the cabin atmosphere.

An exemplary embodiment of the invention provides a device and method for targeting the supply of a water vapor saturated or supersaturated air or oxygen stream in the area of the visual field, in particular inside of aircraft cabins.

According to an exemplary embodiment of the invention, it may be possible to generate a specifically higher oxygen concentration and/or air concentration near the respiratory organs and/or visual field of the user by a moistened free-jet of oxygen or air, thereby possibly entirely eliminating the need for breathing masks. As a result, improper use of breathing masks may be avoided, since no actions need to be taken, e.g., by the passengers. In particular in situations of stress, this may make it possible to preclude the disadvantages of donning a breathing mask to ensure a supply of oxygen. In addition, the elimination of breathing masks may result in a desired local increase in comfort with respect to atmospheric humidity and oxygen concentration, in particular in applications that transpire over a longer period of time.

This may yield a method for increasing the local comfort level, in which a directed two-phase free-jet may be used as a mixture of air/oxygen and water/water vapor to set an oxygen and/or water vapor partial pressure in the visual field of passengers or flight personnel that may be locally elevated in comparison to the cabin atmosphere. In particular, the method for so-called pre-breathing may allow the flight personnel to set a water vapor partial pressure that is higher than the cabin atmosphere by way of a line, directed toward the visual field by a free-jet. In combination with oxygen as the carrier gas, a higher oxygen concentration may simultaneously be set in the area of the visual field and concentration build up may be avoided by exhaustion.

Embodiments of the device according to the invention will be described below. These embodiments apply also to the aircraft according to the invention and the method according to the invention.

The device may comprise a first storage tank that holds the oxygen-containing component and that is couplable with the line. In other words, an air- or oxygen-containing storage tank may be coupled with the line, e.g., by a valve, in such a way that the oxygen-containing component in the storage tank streams into the line. A second storage tank that holds the water-containing component and that is couplable with the line may be provided accordingly. In this case as well, a valve, for example, may be used to correspondingly adjust the supply of the water-containing component from the second storage tank.

The second storage tank may be heatable. This may make it possible to also convert the water-containing component present in a liquid aggregate state into the vaporous phase, in order to then generate a post-discharge free-jet via mixing with the oxygen-containing component.

An area between the outlet opening and visual field of the user may be free of device components. In other words, there may not have to be any physical or structural features between the outlet opening and the visual field of the user.

The device may incorporate a controllable and/or adjustable nozzle and/or hose element in the area of the outlet opening, with which free-jet parameters may be specifically set.

The device may comprise a speed governor, which may be designed to regulate the speed of the free-jet. For example, a throttle valve may be set in such a way as to achieve a desired speed where the free-jet exits the outlet opening.

Further, the device may comprise a heater adapted to evaporate water. Such a heater may additionally fix the temperature of the two-phase jet and/or set the saturation level or vapor concentration, and hence set the moisture of the two-phase jet.

The device may be adapted for attachment to and/or in a demarcated area in a cabin or room. For example, the device may be located behind lateral walls or behind a ceiling wall of an aircraft cabin or another room or vehicle, wherein only the outlet opening and, as an option, an end piece of the line protrudes from this demarcated device. In this way, spatially definable areas may be supplied with oxygen and/or moisture in a visually inconspicuous manner, thereby possibly improving the comfort of a human or animal user in the room.

As an alternative, the device may be set up for portable use on the body of the user. In this embodiment, at least part of the device may be designed as a mobile unit, which may be secured to the head of a user, for example, similarly to a microphone. This may enable a reliable supply of oxygen and moisture to a user, e.g., the cabin personnel of an aircraft, even if the user is constantly moving while using the device.

In addition, the device may comprise a directional adjustment feature to regulate the direction in which the free-jet exits the outlet opening. Specifically prescribing an angular range in which the moisture or air is emitted may make it possible to flexibly react to the geometric particulars of a room.

In addition, the device may comprise a concentration adjustment feature for regulating the concentration of an oxygen-containing component and/or a water-containing component in the two-phase jet. For example, this concentration adjustment feature or unit may use measured sensor signals that yield current oxygen and/or moisture data to dispense a suitable quantity of oxygen and/or moisture to give a high comfort level to a user or suspend supply as need be so as not to generate an unsafe atmosphere.

Further, the device may comprise a suction unit to suck off excess oxygen. Such a suction unit, which may be able to suck off any residual oxygen, when necessary, may be arranged in proximity to the visual field of a user to possibly avoid an undesirably excessive increase in the oxygen concentration, thereby elevating operational safety.

Embodiments of the method according to the invention will be described below. These embodiments apply also to the device according to the invention and aircraft according to the invention.

The mixture may be supplied to the visual field of the user at an injection jet axis speed of at most 10 m/s. This may preclude any impairment to the well being of the person to be supplied.

In addition, the mixture may be supplied to the visual field of the user at an injection jet axis speed of at least 0.5 m/s to 1 m/s. This may prevent the free-jet from already breaking up beforehand, which breaking up possibly would lead to the fact that any specific local increase in oxygen concentration and atmospheric humidity would not be possible anymore.

The mixture exiting the outlet opening may be supersaturated, so that the water-containing component may be present at least partially as a condensate. This may form a kind of aerosol with an atmosphere that offers the user a high level of comfort.

BRIEF DESCRIPTION OF THE DRAWINGS

Exemplary embodiments of the invention will be illustrated in the figures and described in greater detail below.

Shown on.

DESCRIPTION OF PREFERRED
EMBODIMENTS OF THE INVENTION

The illustrations on the figures are diagrammatic, and not true to scale. Identical or similar components in varying figures are marked with the same reference signs.

The depicted embodiments of the devices are used to supply passengers, cabins and flight personnel with additional oxygen, and, simultaneously, with additional moisture.

Figure 1:
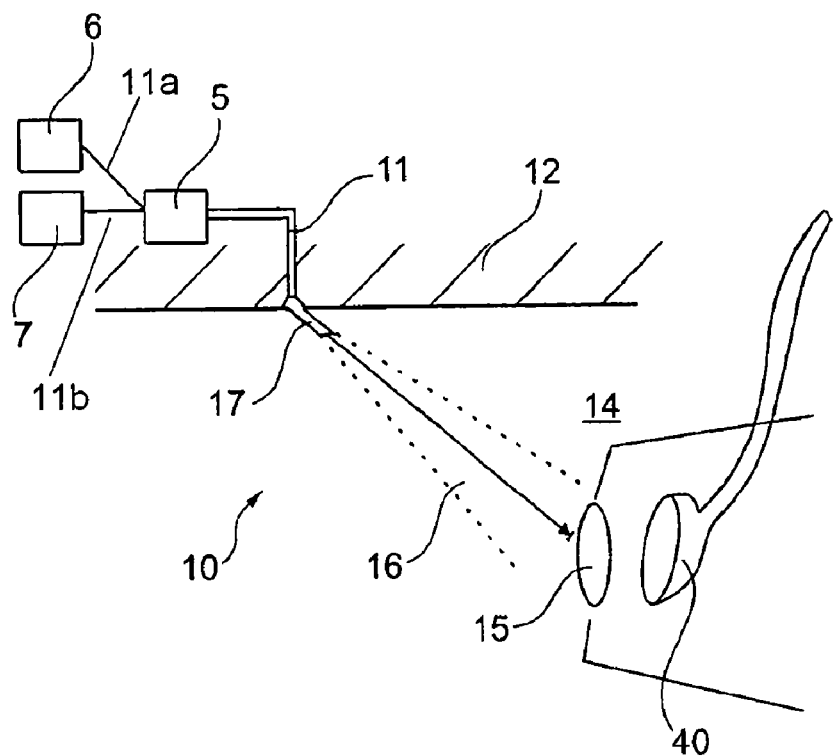
FIG. 1 is part of a diagrammatically depicted device with a nozzle and/or hose element for directing a free-jet of gaseous oxygen and water vapor according to an exemplary embodiment of the invention.

FIG. 1 provides a diagrammatic view of a device 10 or its relevant parts for supplying passengers with additional oxygen and moisture.

The device 10 comprises a container 7 for receiving and holding gaseous oxygen, and another container 6 for receiving and holding water. The container position is freely selectable. Proceeding from the containers 6, 7, respective lines 11a, 11b run toward an area from which the line 11 and/or oxygen streaming through the line 11 and the moisture component exit. The mixture of oxygen and water is conveyed through the line 11 by a transport unit 5 (e.g., a pump). Each line 11 can be arranged in a ceiling element 12 over the seat in an aircraft cabin. In the area of an outlet opening 13, the line 11 empties out into the room 14 to be supplied with oxygen and moisture. The line 11 and/or outlet opening 13 themselves here constitute the means for supplying the oxygen and moisture to the area of respiratory organs, in that a free-jet 16 of oxygen with a pressurized moisture component that exits the outlet opening 13 spreads to the area of the respiratory organs.

The room 14 can be an aircraft cabin, a cargo-loading compartment in the aircraft, or any other room. Once the oxygen and moisture supply has been initiated, a mixture of oxygen and water vapor is released from the line 11 in the area of the outlet opening 13, wherein the oxygen and moisture are provided by means 5 that generate a pressure difference between the containers 6, 7 and the line 11 on the one hand, and the environment, e.g., the room 14, on the other. The outlet opening 13 and/or the line 11 itself can be sealed and reopened by conventional elements (not shown). For example, these elements are connected to a control and/or regulating unit. However, the elements can also be regulatable by setting the pressure in the line 11. While the outlet opening 13 has a defined cross section, however its design can vary depending on the requirements.

The respiratory organs are usually arranged or placed at a distance x from the outlet opening 13. Distance x is determined based on the average size of the person, for example. Distances x in the range up to 0.7 m between the outlet cross-section and respiratory organs are particularly preferred. However, other distances are also possible, if necessary. The distance x and/or space between the outlet opening 13 and the respiratory organs comprises no components of the device 10 itself, allowing the free-jet 16 to propagate unimpeded.

Figure 3:
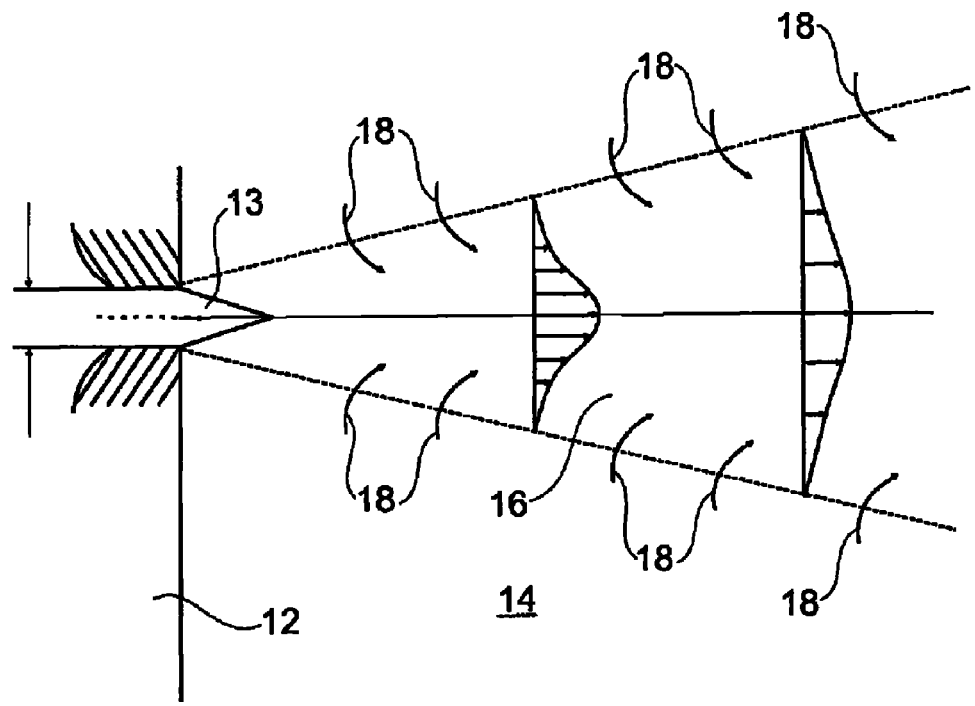
FIG. 3 is a diagrammatic view of free-jet propagation.
Figure 4:
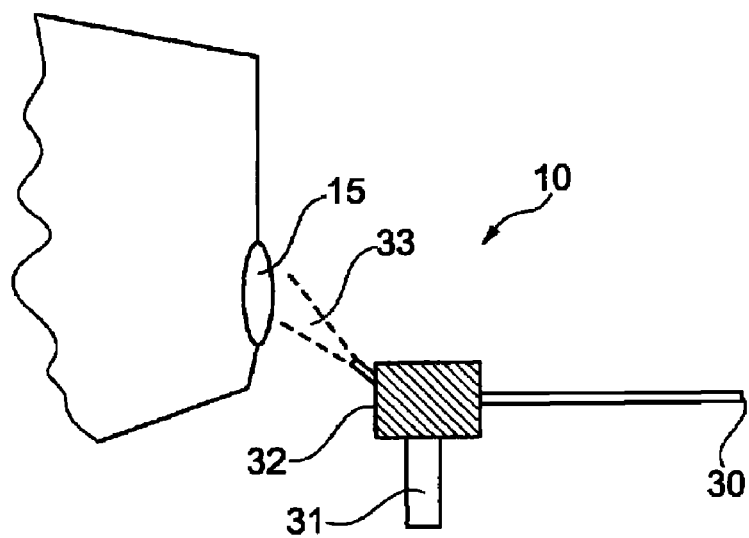
FIG. 4 is a device for supplying a free-jet to the visual field of a user according to an exemplary embodiment of the invention.

A nozzle and/or hose element 17 (see FIG. 1 in particular) is preferably situated in proximity to the outlet opening 13 (see FIG. 3 in particular). The nozzle and/or hose element 17 is controllable and/or regulatable, and adjusted in particular, so that the free-jet 16 and a suction unit 40 can be specifically and directionally positioned. After the free-jet 16 has exited the outlet opening 13 and/or the nozzle and/or hose element 17, the free-jet 16 encounters ambient air 18, and mixes in with it. The free-jet 16 propagation can be calculated based on a constant momentum flow. This means that, in addition to the speed of the free-jet 16 and the jet widening, the oxygen concentration and moisture load of the free-jet 16 can also be calculated, each in relation to the distance x. To this end, comprehensive reference is made to the method proposed by Ricou and Spalding (e.g., see F. P. Ricou, D. B. Spalding: Measurements or entrainment by axisymmetrical turbulent jets. J. Fluid Mech. 11 (1961), pp. 21 to 32). The device 10 also has the suction device 40 for exhausting excess oxygen, so that the residual oxygen can be sucked off in the vicinity of the visual field 15 of the user.

Given the generally slight loading of a continuous gas phase as a carrier gas with water droplets and/or water vapor, the propagation of a free-jet in a gaseous atmosphere is calculated based on a constant momentum flow. FIG. 3 shows the propagation of an isothermal free-jet of gas in a gaseous atmosphere, e.g., see Surma, R., Friedel, L., Bricard, P.: "Geschwindigkeit und Größe der Tropfen in horizontalen Zweiphasen-Freistrahlen aus Wasser und Luft in ruhender Umgebung", Part 1 and Part 2, Techn. Überwachung 44, (2003), 4, pp. 24 to 27, and 5, pp. 26 to 33.

The jet streams out of an outlet cross-section. Because it mixes in with the ambient air, for example, the oxygen concentration and relative humidity along with the speed of the free-jet decrease with increasing distance from the outlet cross section, while the free-jet simultaneously widens.

The propagation of an isothermal free-jet of gas in a gaseous atmosphere will be described based on FIG. 3.

The free-jet 16 streams out of the outlet opening 13 of the line 11 or the nozzle and/or hose element 17. Because the oxygen becomes mixed in with the ambient air 18, the concentrations and speed of the free-jet decrease with increasing distance from the outlet opening 13. At the same time, the free-jet 16 widens. The speed of the free-jet 16 in the area of the respiratory organs preferably measures between 1 m/s and 10 m/s. Below the lower limit, there is a danger that the free-jet 16 will break apart before the additional oxygen has reached the respiratory organs. If the upper limit is exceeded, the free-jet 16 might be perceived as a bothering flow under certain conditions. The magnitude of the mass flow exiting the outlet opening 13 results in the desired and/or required oxygen concentration as a function of the distance x between the outlet opening 13 and respiratory organs. Local oxygen concentrations preferably measuring between approx. 21% and 80% as a function of distances x ranging from 0 m to 0.7 m can be set.

FIG. 1 will once again be referenced in explaining how the invention works in the passenger area. The mixture of oxygen from the air as the carrier gas and water and/or water vapor streams out of the nozzle 17 toward the visual field 15 of the corresponding person. The magnitude of the exiting mass flow generates the desired oxygen concentration as a function of the distance x between the nozzle outlet 17 and respiratory organs.

Figure 2:
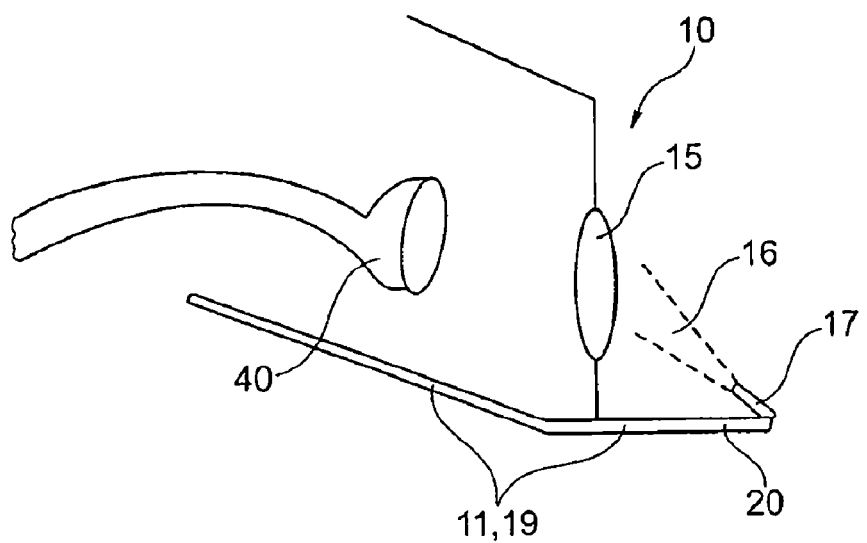
FIG. 2 is part of a diagrammatically depicted device with a supporting element to be worn especially on the body of a user according to another exemplary embodiment of the invention.

FIG. 2 shows another embodiment of the device 10.

The device 10 is shown therein as a mobile unit. The principle underlying the local oxygen supply requiring no action on the part of the person to be supplied reflects the one already described. The line 11 is designed and arranged in such a way that the outlet opening 13 points toward the respiratory organs. For example, the unit can be worn on the back in the form of oxygen tanks known from scuba diving. The line 11 can be run as a flexible hose by fixing elements 19, wherein an end piece 20 of the line 11 and/or a nozzle and/or hose element arranged on the end piece 20 is fixed in the head area, similarly to a headphone or the like. In the exemplary embodiment on FIG. 2, consideration may be given to pre-breathing requirements for the complement on an aircraft. The mixture of oxygen and moisture flows out of a line 11 fixed on the head of the user, e.g., similarly to a microphone. The line is advantageously flexible enough to allow the crew-member to move about freely.

The device 10 on FIG. 2 has a suction unit 40 to suck off excessive oxygen, so that residual oxygen can be sucked off in the vicinity of the visual field 15 of the user.

Because the water vapor is supplied directly, only a small mass flow of water is required, thereby averting a negative influence on electrical and electronic devices, as well as on the insulation of the aircraft structure. The defined gas mixture is already generated upstream from the outlet cross section, so that an air or oxygen free-jet mixed with water vapor streams out toward the visual field. Given the reduction in concentration as a function of distance from the outlet cross section, it might become necessary to supersaturate the exiting two-phase mixture, allowing the water vapor to partially condense and be present as a fine aerosol. A continuous aerosol evaporation makes it possible to achieve a higher atmospheric humidity at a long distance from the outlet cross section by comparison to the free-jet saturated only with water vapor.

FIG. 4 shows such an exemplary embodiment. The available potential can here be checked against measured values.

FIG. 4 shows a stationary embodiment of a device for generating a water vapor saturated free-jet.

A gas supply line 30 routes gaseous oxygen to a mixing unit 32. In addition, preheated water or water vapor from a heatable liquid reservoir 31 is fed to a mixing unit 32, which specifically mixes the gaseous oxygen and water vapor, thereby generating a free-jet 33 directed toward the mouth/nose in the visual field 15 of a user.

According to the invention, local atmospheric humidity levels of at least 30% can be set as a function of the embodiment of the invention between the outlet cross section and visual field for distance of 0.1 to 0.5 m. The adjustable oxygen concentrations can be set based on the aforementioned study by Surma, Friedel and Bricard.

The calculation of water vapor partial pressure for achieving a desired atmospheric humidity in the area of the visual field will be introduced below.

According to an exemplary embodiment of the invention, the calculations can be based upon the following assumptions:

- Omission of gravitational acceleration
- Omission of atmospheric turbulence (no indoor air prespeeds)

Ideal outflow from the cover and/or hose piece
Ideal gas
Ideal mixing behavior In addition, a conservative calculation is performed, since in principle a water vapor partial pressure of roughly 0 mbar in the vicinity of the free-jet is taken as the basis, so that the decrease in atmospheric humidity represents the theoretical maximum value.

In an even more realistic calculation, only the difference in concentration is assumed.

An example in which a water vapor partial pressure of 6 mbar is achieved in the vicinity of the visual field will be described below. To this end, a flight altitude of 8,000 feet, an ambient pressure of 752 mbar, a temperature of 20° C. and an ambient water vapor partial pressure of 0 mbar are assumed.

A water pressure partial pressure of 6 mbar is required, corresponding to a 30% saturation, since the saturation vapor pressure measures 20 mbar at 20° C.

The decrease in concentration and/or partial pressure is calculated according to the following formula:

$$P_{P\ water(g),axis}(x)=P_{P\ water(g),outlet}\cdot d_{nozzle}/(0.1856\cdot x) \quad (1)$$

Equation (1) can be used to determine the distance from the outlet cross section to the point downstream at which the required partial pressure is present:

$$x/d0=17.96 \quad (2)$$

The correlation of equation (2) determines the outlet diameter d0 as a function of the distance x between the source and respiratory organ:

$$x1=0.1\ \text{m}\Rightarrow d0=5.57\ \text{mm} \quad (3)$$

$$x2=0.5\ \text{m}\Rightarrow d0=27.8\ \text{mm} \quad (4)$$

The way in which the invention works will be explained in detail again below based on the embodiment according to FIG. 1.

If necessary, the outlet opening 13 opens, so that gaseous oxygen exits the line 11 mixed with moisture. The outlet opening 13 and/or the nozzle and/or hose element 17 is/are aligned in such a way as to aim the forming free-jet 16 of oxygen and water directly at the respiratory organs. This basic or additional supply of oxygen and moisture takes place without any intervention by the person to be supplied. The oxygen and moisture are released directly to the room 14 from the line 11 and/or outlet opening 13. The free-jet 16 hits the respiratory organs at a maximum speed of 10 m/s. Should the supplied oxygen concentration be insufficient, just reducing the distance, e.g., by tilting the head, can increase the concentration of oxygen and water vapor. The gas/vapor phases can be heated as well, increasing the specific volume. This reduces the difference relative to the specific volume of the ambient air, keeping the oxygen and moisture in an upper head region for a longer period of time.

The other described and not explicitly depicted embodiments follow the same principle. In the embodiment with the mobile unit from FIG. 2, the person wearing the device 10 can move freely, and yet concurrently increase the oxygen content in the blood and moisten the respiratory organs. The additional supply can even be continued during flight operation. Because the device 10 is arranged on the body, the device 10 follows the movements of the person to be supplied.

In addition, it must be pointed out that “comprising” does not preclude any other elements or steps, and “one” or “a” does not exclude a plurality. Let it also be noted that features or steps described with reference to one of the above exemplary embodiments can also be used in combination with other features or steps from other exemplary embodiments described above. Reference numbers in the claims are not to be regarded as restrictive.

What is claimed is:

1. A combination of an aircraft cabin and a device for supplying a free-jet to the visual field of a user in the aircraft cabin, wherein the device comprises:

a line;

an outlet nozzle located within the aircraft cabin;

a transport unit;

an additional line;

an additional outlet nozzle;

an additional transport unit; and a storage tank of an oxygen-containing component and a container of a water-containing component, the oxygen-containing component and the water-containing component being suppliable to the line and the additional line;

wherein a mixture of the oxygen-containing component and the water-containing component is transportable by the transport unit through the line to the outlet nozzle, so that the mixture streams through the outlet nozzle in the form of a free-jet directly toward the visual field of the user such that the free-jet is supplied to the visual field with an injection jet axis speed of at least 0.5 meters per second (m/s) to increase oxygen concentration and atmospheric humidity at the visual field;

wherein a mixture of the oxygen-containing component and the water-containing component is transportable by the additional transport unit through the additional line to the additional outlet nozzle, so that the mixture streams through the additional outlet nozzle directly toward the visual field of another user;

wherein the device is adapted in such a way that the mixture exiting the outlet nozzle is supersaturated, so that the water-containing component at least partially condenses after the mixture has exited the outlet nozzle, the free-jet not being guided by a conduit between the outlet nozzle and the visual field of the user, and wherein the device is arranged behind a wall of the aircraft cabin such that only the outlet nozzle protrudes from the wall, the wall being a lateral wall or a ceiling wall of the aircraft cabin.

2. The combination of an aircraft cabin and the device according to claim 1, wherein the storage tank of the oxygen-containing component is couplable with the line.

3. The combination of an aircraft cabin and the device according to claim 1, wherein the container of the water-containing component is couplable with the line.

4. The combination of an aircraft cabin and the device according to claim 3, wherein the container of the water-containing component is heatable.

5. The combination of an aircraft cabin and the device according to claim 1, wherein an area between the outlet nozzle and the visual field of the user is free of components of the device.

6. The combination of an aircraft cabin and the device according to claim 1, further comprising:

a controllable and/or regulatable nozzle and/or hose element in the vicinity of the outlet nozzle.

7. The combination of an aircraft cabin and the device according to claim 1, further comprising:

a speed regulating unit that is set up to regulate a speed of the free-jet.

8. The combination of an aircraft cabin and the device according to claim 1, further comprising:

a heater set up to heat the free-jet in the vicinity of the line and/or the outlet nozzle.

9. The combination of an aircraft cabin and the device according to claim 1, which is set up for attachment to and/or in demarcated areas in a cabin or room.

10. The combination of an aircraft cabin and the device according to claim 1, with a directional adjustment feature to regulate the direction in which the free-jet exits the outlet nozzle.

11. The combination of an aircraft cabin and the device according to claim 1, with a concentration adjustment feature for regulating the concentration of oxygen-containing component and/or water-containing component in the free-jet.

12. The combination of an aircraft cabin and the device according to claim 1, further comprising a suction unit to suck off excess oxygen.

13. An aircraft comprising a combination of an aircraft cabin and a device according to claim 1 for supplying a free-jet to the visual field of a user.

14. The combination of an aircraft cabin and the device according to claim 1, wherein the free-jet is supplied to the visual field with an injection jet axis speed of at least 1 m/s.

15. A method for supplying a free-jet to the visual field of a user in an aircraft cabin, wherein the method comprises:
   arranging a device for supplying the free-jet to the visual field of the user in the aircraft cabin, the device comprising a line, an outlet nozzle located within the aircraft cabin, an additional line, an additional outlet nozzle and a storage tank of an oxygen-containing component, the device being behind a wall of the aircraft cabin such that only an outlet nozzle connected to the line protrudes from the wall, the wall being a lateral wall or a ceiling wall of the aircraft cabin;
   supplying the oxygen-containing component from the storage tank and a water-containing component to the line and the additional line;
   transporting a mixture of the oxygen-containing component and water-containing component through the line to the outlet nozzle located within the aircraft cabin,
   streaming out the mixture through the outlet nozzle in the form of a free-jet directly toward the visual field of the user such that the free-jet is supplied to the visual field with an injection jet axis speed of at least 0.5 m/s to increase oxygen concentration and atmospheric humidity at the visual field, and
   supersaturating the mixture exiting the outlet nozzle, so that the water-containing component at least partially condenses after the mixture has exited the outlet nozzle,
   the free-jet not being guided by a conduit between the outlet nozzle and the visual field of the user;
   transporting a mixture of the oxygen-containing component and water-containing component through the additional line to the additional outlet;
   streaming out the mixture through the additional outlet nozzle in the form of a free-jet directly toward the visual field of another user.

16. The method according to claim 15, further comprising using oxygen or air as the oxygen-containing component.

17. The method according to claim 15, further comprising using water or water vapor as the water-containing component.

18. The method according to claim 15, wherein the free-jet is supplied to the visual field with an injection jet axis speed of at least 1 m/s.

19. A device for supplying a free-jet to the visual field of a user in an aircraft, wherein the device comprises:
   a line;
   an outlet nozzle located within the aircraft;
   a transport unit;
   an additional line;
   an additional outlet nozzle;
   an additional transport unit; and
   a storage tank of an oxygen-containing component and a container of a water-containing component, the oxygen-containing component and the water-containing component being suppliable to the line and the additional line;
   wherein a mixture of the oxygen-containing component and the water-containing component is transportable by the transport unit through the line to the outlet nozzle, so that the mixture streams through the outlet nozzle in the form of a free-jet directly toward the visual field of the user such that the free-jet is supplied to the visual field with an injection jet axis speed of at least 0.5 m/s to increase oxygen concentration and atmospheric humidity at the visual field;
   wherein a mixture of the oxygen-containing component and the water-containing component is transportable by the additional transport unit through the additional line to the additional outlet nozzle, so that the mixture streams through the additional outlet nozzle directly toward the visual field of another user; and
   wherein the device is adapted in such a way that the mixture exiting the outlet nozzle is supersaturated, so that the water-containing component at least partially condenses after the mixture has exited the outlet nozzle,
   the free-jet not being guided by a conduit between the outlet nozzle and the visual field of the user,
   the storage tank of the oxygen-containing component not being connected to the container of the water-containing component except through the transport unit.

20. A device for supplying a free-jet to the visual field of a user in an aircraft cabin, wherein the device comprises:
   a line;
   an outlet nozzle located within the aircraft cabin;
   a transport unit;
   an additional line;
   an additional outlet nozzle;
   an additional transport unit; and
   a storage tank of an oxygen-containing component and a container of a water-containing component, the oxygen-containing component and the water-containing component being suppliable to the line and the additional line;
   wherein a mixture of the oxygen-containing component and the water-containing component is transportable by the transport unit through the line to the outlet nozzle, so that the mixture streams through the outlet nozzle in the form of a free-jet directly toward the visual field of the user such that the free-jet is supplied to the visual field with an injection jet axis speed of at least 0.5 meters per second (m/s) to increase oxygen concentration and atmospheric humidity at the visual field;
   wherein a mixture of the oxygen-containing component and the water-containing component is transportable by the additional transport unit through the additional line to the additional outlet nozzle, so that the mixture streams through the additional outlet nozzle directly toward the visual field of another user; and
   wherein the device is adapted in such a way that the mixture exiting the outlet nozzle is supersaturated, so that the water-containing component at least partially condenses after the mixture has exited the outlet nozzle,
   the free-jet not being guided by a conduit between the outlet nozzle and the visual field of the user,
   wherein the line comprises a flexible hose and the outlet nozzle is fixable to the head of the user.

* * * * *